United States Patent
Levine et al.

(10) Patent No.: US 6,257,558 B1
(45) Date of Patent: Jul. 10, 2001

(54) REEL FOR DISPENSING AND COLLECTING ELECTRIFIED WIRE

(76) Inventors: Paul A. Levine; Kristen M. Levine, both of 3510 Forelock Dr., Tarpon Springs, FL (US) 34689

( * ) Notice: Subject to any disclaimer, the term of this patent is extended or adjusted under 35 U.S.C. 154(b) by 0 days.

(21) Appl. No.: 09/313,481

(22) Filed: May 17, 1999

(51) Int. Cl.[7] ............................. H05C 1/00; A01M 29/00
(52) U.S. Cl. ...................... 256/10; 242/380; 191/12.2 R; 256/32; 256/40
(58) Field of Search ................... 256/73, 32, 10, 256/40, 42, 44, 1; 191/12.2 R; 242/380

(56) References Cited

U.S. PATENT DOCUMENTS

| | | | |
|---|---|---|---|
| 1,976,721 | * 10/1934 | Gengler | 256/10 |
| 3,016,229 | * 1/1962 | Jacobson | 256/10 |
| 3,684,248 | * 8/1972 | Maes, Jr. | 256/10 |
| 4,040,604 | * 8/1977 | Langlie et al. | 256/10 |
| 4,171,523 | * 10/1979 | Parkitny | 256/10 |
| 5,535,960 | * 7/1996 | Skowronski et al. | |
| 5,701,981 | * 12/1997 | Marshall et al. | |

FOREIGN PATENT DOCUMENTS

| | | | |
|---|---|---|---|
| 2685165 | * 6/1993 | (FR) | . |
| 830458 | * 3/1960 | (GB) | . |
| 188832 | * 10/1981 | (NZ) | . |
| 2143876 | * 2/1985 | (NZ) | . |

* cited by examiner

Primary Examiner—B. Dayoan
Assistant Examiner—Tomlyne Malcolm
(74) Attorney, Agent, or Firm—Ronald E. Smith; Smith & Hopen, P.A.

(57) ABSTRACT

An apparatus for protecting the gate of an animal enclosure with an electrified wire that also extends along fencing includes a reel that dispenses and collects the wire to minimize the possibility of shock during gate opening and closing procedures. A hollow reel housing is mounted to a first fence post to which the gate is hingedly attached. A truncate wire connected to a source of electrical power such as an electrified fence wire extends into the hollow reel housing through a first opening and is connected to a nonrotating electrical contact. An annular rotating electrical contact is in electrical communication with a proximal end of wire coiled about the reel and is mounted on the reel so that the wire remains in electrical communication with the source of power when the reel is rotating in a wire-dispensing direction or in a wire-collecting direction. The wire, when uncoiled, extends through a second opening formed in the hollow reel housing. The distal free end of the wire is connected to a handle latch member that engages a handle catch member mounted on a second fence post adjacent the free end of the gate when the uncoiled wire is extended across the gate. The handle latch member includes an insulated handle which is grasped during wire dispensing and collecting. The reel is spring-loaded and loads during dispensing and unloads during collecting. An indicator light is illuminated when power is supplied to the apparatus.

6 Claims, 2 Drawing Sheets

REEL FOR DISPENSING AND COLLECTING ELECTRIFIED WIRE

BACKGROUND OF THE INVENTION

1. Field of the Invention

This invention relates, generally, to devices that include electrified wire for keeping animals away from fencing. More particularly, it relates to a reel for dispensing and collecting a wire for electrification of a hingedly mounted gate.

2. Description of the Prior Art

High voltage, low amperage currents are commonly applied to wires that protect enclosures for large animals such as cows and horses. The electrified wires are commonly mounted along the length of fences and gates to prevent such animals from leaning on them and possibly knocking them down. For example, at feeding time a horse may become excited and press against a gate, trying to get to the food before it is delivered. Cows and horses also press against fences if they can see thick green grass or other attractive food on the other side of the fence. Their great strength and weight often leads to a damaged gate or fence. If animals receive a non-lethal but painful shock when pressing against a gate or fence, they soon learn to avoid that behavior, thereby preserving the structural integrity of the fence or gate.

If an electrified wire protects a fence and gate structure, such structure need not be as expensive or intrusive as an unprotected structure built to withstand pressure from animals often weighing a half-ton or more. An electrified wire can even be used as a temporary enclosure or barrier with relatively weak posts as the only means for support.

The gate area is problematic because the electrified wire must be temporarily removed when the gate is opened, and reinstalled across the gate when the gate is closed. The wire remains electrified when it is moved to allow opening of the gate so the person opening the gate must be careful not to touch it. Typically, the wire length is ten to fourteen feet in length, and may be much longer. Accordingly, it is very difficult to handle without being shocked. There is no particular place to put the electrified wire that has been removed from the gate, so it is usually just placed on the ground and care is taken not to step on it.

When the electrified wire is lying on the ground, the animals are also at risk of receiving an accidental shock.

Reinstalling the electrified wire after the gate has been closed is just as problematic. A person who avoids a shock during the gate-opening procedure might still receive a shock during the time the gate is open and during the gate-closing procedure.

What is needed, then, is an apparatus that substantially reduces the chances that a person handling an electrified wire during gate-opening and gate-closing procedures will receive a painful shock.

However, it was not obvious to those of ordinary skill in this art how the needed improvements could be provided, in view of the art considered as a whole at the time the present invention was made.

SUMMARY OF THE INVENTION

The long-standing but heretofore unfulfilled need for an innovation that overcomes the limitations of the prior art is now met by a new, useful, nonobvious and therefore inventive apparatus for dispensing and collecting an electrified wire in a way that protects a person opening and closing an electrified gate from being shocked. The novel apparatus also protect animals from receiving shocks during the time a gate is open.

When it is desired to protect a gate from damage of the type caused by an animal such as a horse pressing against it, an insulated plastic housing for storing electrified wire in coiled configuration is mounted to a first fence post or support member to which the gate is hingedly attached. A distal free end of the wire is then dispensed from a reel that is rotatably mounted within the housing until it extends across the breadth of the gate and said distal end is attached to a bracket secured to a second fence post or support member adjacent the free end of the gate. A gate catch means is also mounted on the second fence post, said gate catch means being adapted to releasably engage a gate latch means mounted to the free end of the gate.

More particularly, the novel apparatus includes a hollow plastic reel housing adapted to be mounted on the first support member and a rotatably mounted reel means is disposed within the hollow reel housing.

A preselected length of wire is disposed in coiled relation about the reel means and a proximal end of the wire is adapted for connection to a remote source of electrical power that is external to the hollow reel housing.

A distal free end of the wire is electrically connected to a handle latch means having a proximal end and a distal end. An electrically insulated handle means is disposed between the proximal and distal ends of the handle latch means so that a user can grasp the handle means without being shocked.

A bias means is connected to the reel means. The bias means is loaded when a preselected length of the wire is dispensed from the reel means; the bias means rotates in a first direction during such dispensing. The bias means is unloaded when the preselected length of wire is collected onto the reel means; the bias means rotates in a second direction opposite to the first direction during such collecting.

A continuous contact means maintains the proximal end of the wire in electrical contact with the remote source of power when the wire is being dispensed from the reel means and collected onto the reel means.

Accordingly, a user of the apparatus need touch only the insulated handle means when dispensing and collecting wire and wire that is not extended across the gate is coiled about the reel means.

A first opening is formed in the hollow reel housing and a first or proximal end of the wire extends through the first opening for connection to the remote source of electrical power.

A first bracket is formed of an electrically conducting material and is mounted on the first support member adjacent the hollow reel housing. The first bracket is electrically connected to the remote source of electrical power. The proximal end of the wire is connected to the first bracket.

A second bracket is formed of an electrically conductive material and is mounted on the second support member adjacent the free end of the gate. A gate catch means is mounted on the second support member and a gate latch means is mounted on the free end of the gate. The gate catch means is adapted to releasably engage the gate latch means when the gate is closed. The second bracket means is in electrical communication with the remote source of electrical power and includes a second bracket catch means. The wire extends across the gate when the gate is closed and is held in place when the distal end of the handle latch means is engaged to the second bracket catch means.

The continuous contact means includes a cap member that rotates conjointly with the reel means. The cap member includes a first electrical contact on an interior surface thereof that is in electrical communication with the proximal end of the wire and the cap member further includes a second electrical contact on an exterior surface thereof. The first electrical contact is in electrical communication with the second electrical contact.

The continuous contact means further includes a non-rotating contact member mounted on an interior wall of the hollow reel housing; it is biased toward and is disposed in sliding contacting relation to the second electrical contact. In this way, power applied to the proximal end of the wire is delivered to the first and second electrical contacts, and said second rotating contact remains in electrical communication with the non-rotating contact mounted on the non-rotating hollow reel housing even when the reel means is rotating in a first direction during wire dispensing or in a second direction during wire collection.

It is a primary object of this invention to provide an apparatus that dispenses and collects a gate-protecting electrified wire in such a way as to minimize the chances that a user will be inadvertently shocked when a gate is opened and closed.

A more specific object is to provide an apparatus that prevents an electrified wire, that has been removed from a gate to enable opening of the gate, from being spread upon the ground in a haphazard, shock-inviting way.

Another object is to provide an apparatus that includes a spring-loaded reel so that the wire is taut when in its deployed configuration and so that a spring provides the power required to collect an electrified wire onto the reel.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
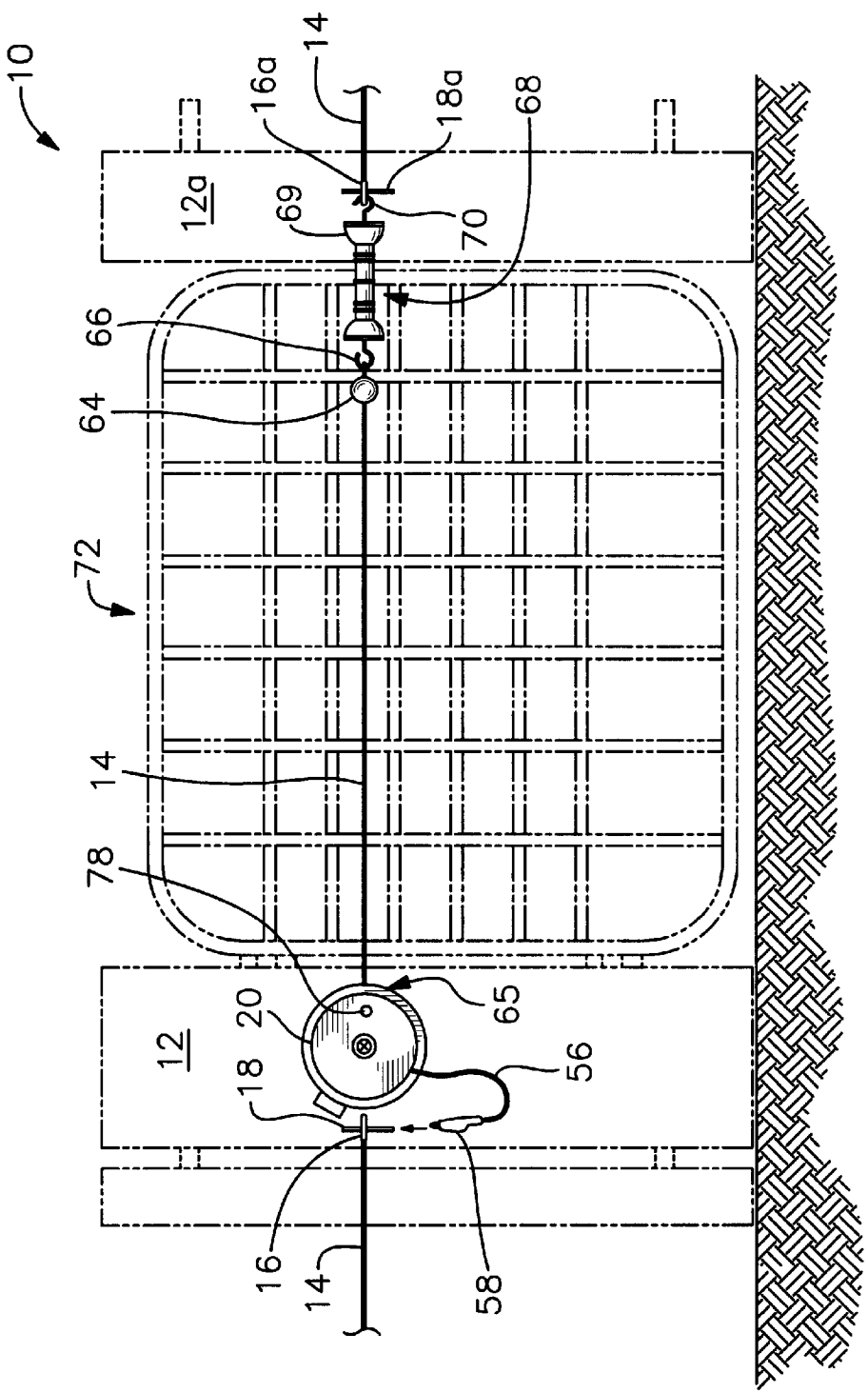
FIG. 1 is a front elevational view depicting the novel apparatus when an uncoiled length of wire is disposed in gate-protecting relation to a closed gate.

Referring now to FIG. 1, it will there be seen that an exemplary embodiment of the invention and a typical environment thereof is denoted as a whole by the reference numeral 10.

Reference numeral 12 denotes a fence post or first support member that forms a first end of a fence structure. An elongate electrified wire 14 is secured to a first or outboard end of a horizontally disposed metal plate 16 that forms a part of metal bracket 18 that is secured by suitable means to said fence post 12.

An insulated, hollow reel housing 20 is fixedly secured by suitable means to fence post 12 in spaced apart relation to bracket 18. As best understood in connection with FIG. 3, reel housing 20 includes a plastic base 22 and a plastic cover 24 that snap-fittingly engages base 22 about its outer peripheral edge.

A rotatably mounted, spring-loaded reel means 26 (FIGS. 3 and 4) having coiled bias means 25 (FIG. 1) is positioned in the hollow interior of reel housing 20. Reel means 26 is mounted for rotation about a central axis 27 defined by a fastening means, not shown, that also serves to hold base 22 and cover 24 together. Reel means 26 includes a circular, flat metal end plate 28 that overlies an interior wall of plastic base 22 and a circular, flat plastic end plate 30 that overlies an interior wall of plastic cover 24 and which is disposed in parallel, axially spaced apart relation to said metal plate 28.

Wire 14 is coiled about hollow reel base 32 that is defined by a plurality of circumferentially spaced apart spacer members, not shown, that are positioned in parallel, radially outward relation to central axis 27. The spacer members are formed integrally with plastic end plate 30 and extend to metal end plate 28. The diameter of reel base 32 is substantially less than the common diameter of end plates 28, 30.

A wall, not shown, is positioned within the cylindrical space defined by the interior of hollow reel base 32 and is centrally apertured to receive the fastening means that is coextensive with axis of rotation 27. A pair of upstanding truncate walls formed in said wall forms a wire guide means, not shown. The spacer members and wall form a cavity, not shown, for receiving a few inches 14a (FIG. 3) of the proximal end of wire 14. More particularly, wire 14a extends through an opening between an unillustrated contiguous pair of spacer members and is threaded between the unillustrated wire guide means to cause wire 14a to follow a serpentine path of travel so that it is not stressed.

A circular cap member 42 is disposed in substantially coplanar relation to end plate 28 and closes the above-mentioned, unillustrated cylindrical cavity. An electrical contact 43 is mounted on an interior wall of cap member 42 and is in electrical communication with the proximal end 14a of wire 14. Annular electrical contact 50 (FIG. 4) is mounted on the exterior wall of cap 42.

Figure 2:
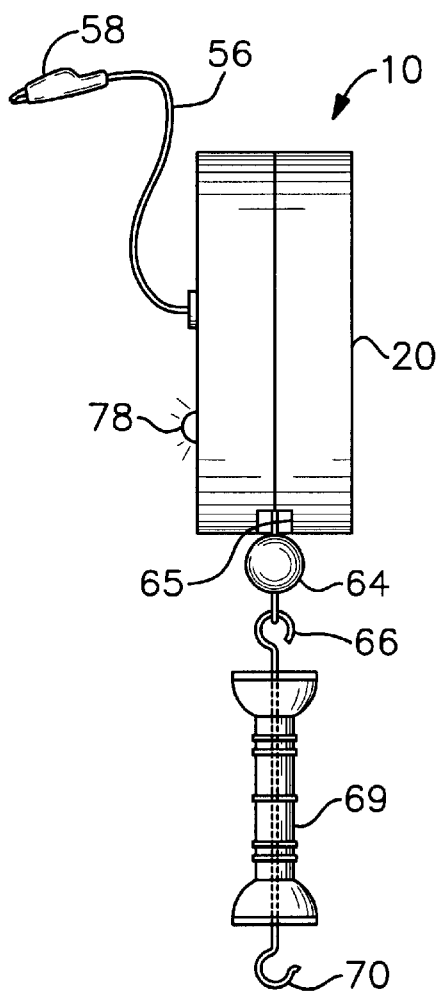
FIG. 2 is a side elevational view of the novel apparatus when the wire is in its fully retracted, coiled configuration.
Figure 3:
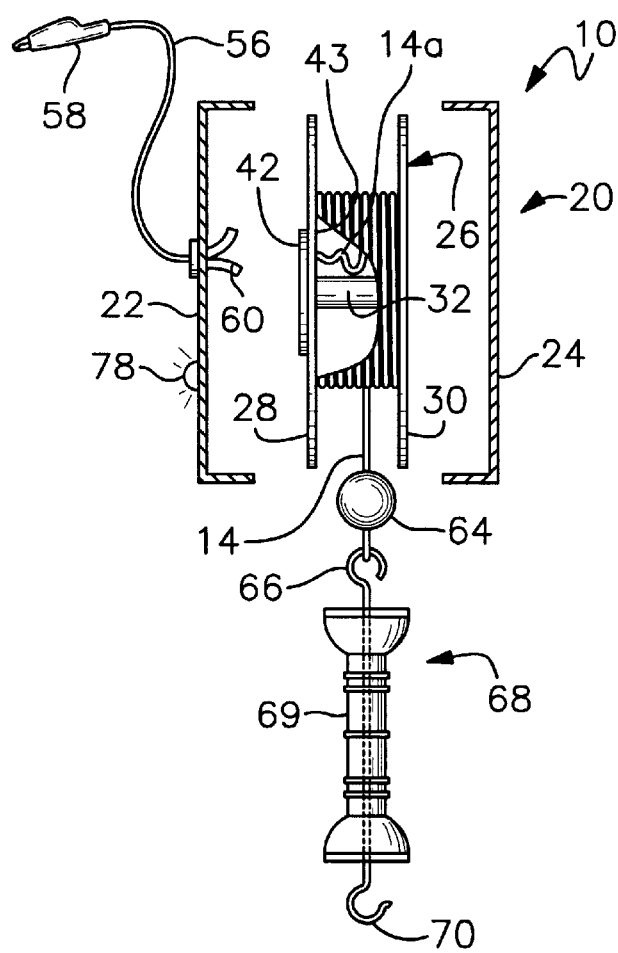
FIG. 3 is an exploded view of the novel apparatus when the wire is in its fully retracted, coiled configuration.
Figure 4:
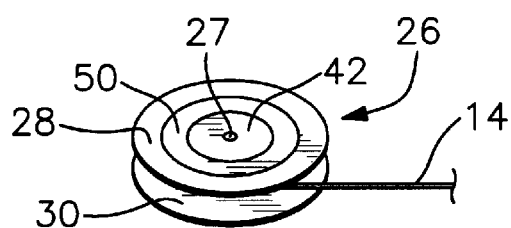
FIG. 4 is a perspective view of the novel reel means.

As indicated in FIGS. 1–3, a truncate, insulated conductor 56 extends through a first opening formed in reel housing 20 and the distal free end of said conductor 56 is electrically connected to a second end of horizontally disposed metal plate 16 (FIG. 1) and hence to metal bracket 18 by suitable means such as an alligator clip 58.

As best understood in connection with FIG. 3, a second end of conductor 56 is positioned inside reel housing 20 in electrical communication with electrical contact 60 which is preferably V-shaped as shown and which has a self-biasing, flexible construction. When reel housing cover 24 is secured to reel housing base 22, contact 60 abuts annular contact 50. As end plate 28 and hence cap member 42 rotate during dispensing or collecting of wire 14, nonrotating electrical contact 60 maintains electrical contact with rotating annular contact 50. The self-biasing, V-shaped construction of contact 60 helps ensure that it remains in such contact even if reel means 26 wobbles about central axis 27 during dispensing of collecting of wire 14.

The depicted structure uses DC power; thus there is only one stationary contact 60 and one annular contact 50. If AC power is used, there would be a second stationary contact in electrical communication with conductor 56 and a second annular contact, concentric with annular contact 50, in electrical communication with said second stationary conductor.

The distal free end of wire 14 extends through a stop member 64 which may take the form of a spherical member having a preselected diameter as depicted in FIGS. 1–3 or a nonspherical member, not shown, having a preselected breadth. Wire 14 extends through second opening 65 (FIG. 2) formed in reel housing 20, but stop member 64 cannot.

Said distal free end of wire 14 is secured to the proximal end 66 of an electrically conductive handle latch member 68. The distal free 70 end of said handle latch member 68 is adapted to releasably engage a first end of a horizontal metal plate 16a (FIG. 1) of a metal bracket 18a that is fixedly secured to a second fence post or second support member 12a. An insulated handle 69 covers the medial part of handle latch member 68.

Gate 72 is hingedly mounted to fence post 12 at a first end thereof and a second end of said gate 72 includes a gate latch means, not shown, that releasably engages a gate catch means, not shown, that is secured to fence post 12a when gate 72 is closed.

To protect gate 72 from being pushed open by animals such as horses when in its closed position, i.e. when the gate latch means is captured by the gate catch means, electrified wire 14 is uncoiled from reel means 26 by grasping insulated handle 69 and walking from fence post 12 to fence post 12a and attaching distal end 70 of handle latch member 68 to an inboard end of metal plate 16a of metal bracket 18a. This stretches electrified wire 14 across gate 72 and shocks horses or other animals enough to deter them from pressing against the gate.

To open the gate, the distal end 70 of handle latch member 68 is detached from said metal plate 16a and the wire is tugged a little in a well-known way to cause spring-loaded reel means 26 to begin collecting said wire 14. The user walks toward reel housing 20 as reel means 26 rotates until stop member 64 abuts opening 65 formed in housing 20, thereby terminating the collecting process.

An indicator light 78 may also be mounted on hollow reel housing 20; it is in electrical communication with the remote source of power and is therefore illuminated when power is applied to the electrified wire.

When the novel structure is used, electrified wire is never deposited onto the ground in the gate area, and the user is not subjected to accidental shocks when opening or closing the gate. Keeping the wire off the ground also prevents electrical shorts and thus prevents rendering the entire system inoperable.

The size of opening 65 is also sufficiently large to allow use of many different types of electrified wire, including flat stranded ribbon, stranded cable, solid cable, and so on. Stranded stainless wire wrapped on nylon is preferred because it is more visible and more durable than aluminum wire.

With plastic rods or other expedient means to serve as fence posts, the novel structure can be used to provide electrified temporary fencing having an electrified gate. Such an arrangement could be used to protect a garden from small animals, for example. Any length of wire up to fifty feet or even more may be used.

This invention represents a major breakthrough in the art of electrified wire installations for protecting gates. Being drawn to a pioneering invention, the claims that follow are entitled, as a matter of law, to broad interpretation to protect the heart or essence of the invention from piracy.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An apparatus for dispensing and collecting an electrified wire, comprising:

a hollow reel housing adapted to be mounted on a first support member;

a rotatably-mounted reel means disposed within said hollow reel housing;

a preselected length of wire disposed in coiled relation about said reel means;

a proximal end of said wire being adapted for connection to a remote source of electrical power that is external to said hollow reel housing;

an electrically conductive handle latch means having a proximal end and a distal end;

an electrically insulated handle means mounted on said handle latch means between said proximal and said distal end of said handle latch means;

a distal end of said wire being connected to said proximal end of said handle latch means;

a bias means connected to said reel means;

said bias means being loaded when a length of said wire is dispensed from said reel means, said bias means rotating in a first direction during such dispensing;

said bias means being unloaded when said length of wire is collected onto said reel means, said bias means rotating in a second direction opposite to said first direction during such collecting;

continuous contact means for maintaining said proximal end of said wire in electrical contact with said remote source of power when said wire is being dispensed from said reel means and collected onto said reel means;

a first opening formed in said hollow reel housing;

a truncate conductor having a proximal end disposed within said hollow reel housing in electrical communication with said proximal end of said wire;

said truncate conductor extending through said first opening formed in said hollow reel housing;

a first bracket means formed of an electrically conducting material, said first bracket means being mounted on said first support member adjacent said hollow reel housing, and said first bracket means being electrically connected to said remote source of electrical power;

said truncate conductor having a distal free end adapted to be electrically connected to said first bracket means;

a second opening formed in said hollow reel housing through which said wire extends when being dispensed or collected, said second opening having a size sufficient to allow use of a wire having a large diameter and said second opening further allowing use of a wire of small diameter, said size of said second opening being independent of a wire size extending therethrough;

whereby a user of said apparatus may use one apparatus to accommodate wires of differing diameters under differing applications;

whereby operation of said apparatus is not subject to fouling by outdoor elements;

whereby a user of said apparatus need touch only said insulated handle means when dispensing and collecting wire; and whereby wire that is not extended across a gate means is coiled about said reel means.

2. The apparatus of claim 1, further comprising a second bracket means formed of an electrically conductive material, said second bracket means being mounted on a second support member that is spaced apart from said first support member, said first and second support members being separated by said gate means, said second bracket means being in electrical communication with said remote source of electrical power, said second bracket means including a bracket catch means, and said wire extending across said gate means when said gate means is closed and when said distal end of said handle latch means is engaged to said bracket catch means.

3. The apparatus of claim 1, wherein said continuous contact means includes a cap member that rotates conjointly with said reel means, said cap member including an electrical contact on a first surface thereof that is in electrical communication with said proximal end of said wire and said cap member including an annular electrical contact on a second surface thereof, said first electrical contact being in electrical communication with said annular electrical contact.

4. The apparatus of claim 3, wherein said continuous contact means further includes a non-rotating electrical contact mounted on an interior wall of said hollow reel housing, said non-rotating electrical contact being disposed in sliding contacting relation to said annular electrical contact.

5. The apparatus of claim 4, further comprising a stop member secured to said wire near said distal end thereof, said stop member having a breadth greater than said breadth of said second opening to stop collection of said wire onto said reel means when said stop member abuts said second opening.

6. The apparatus of claim 1, further comprising an indicator light mounted on said hollow reel housing and said indicator light being in electrical communication with said remote source of power so that it is illuminated when power is supplied to said wire by said remote source of power.

* * * * *